US006966980B2

(12) United States Patent
Blackburn

(10) Patent No.: US 6,966,980 B2

(45) Date of Patent: Nov. 22, 2005

(54) SSF/X SLOW SAND FILTER

(75) Inventor: Humphrey Marshall Blackburn, The Sea Ranch, CA (US)

(73) Assignee: Humphrey Blackburn, Custer, WA (US)

( * ) Notice: Subject to any disclaimer, the term of this patent is extended or adjusted under 35 U.S.C. 154(b) by 347 days.

(21) Appl. No.: 10/347,426

(22) Filed: Jan. 21, 2003

(65) Prior Publication Data

US 2004/0140250 A1 Jul. 22, 2004

(51) Int. Cl.[7] .............................................. B01D 35/00

(52) U.S. Cl. ............................ 210/90; 210/93; 210/94; 210/137; 210/269; 210/288

(58) Field of Search ............................ 210/281, 86, 90, 210/93, 94, 137, 263, 269, 288

(56) References Cited

U.S. PATENT DOCUMENTS

| | | | | | |
|---|---|---|---|---|---|
| 3,823,824 | A | * | 7/1974 | Close | 210/86 |
| 5,032,261 | A | * | 7/1991 | Pyper | 210/137 |
| 5,112,483 | A | * | 5/1992 | Cluff | 210/223 |
| 5,264,129 | A | * | 11/1993 | Simpson et al. | 210/611 |
| 5,993,672 | A | * | 11/1999 | Manz | 210/744 |

* cited by examiner

*Primary Examiner*—Terry K. Cecil

(57) ABSTRACT

The SSF/x slow sand filter for use in treating drinking water for homes or rural villages with features providing simpler on-site assembly, preset maximum flow, easy monitoring of pressure head loss, protection of piping, and a harrowing system for cleaning. The filter employs a novel hydraulic scheme which places most pipe and plumbing within the filter vessel. The filter employs a novel device that combines flow control, pressure measurement, freeze protection, and anti-siphon features. This in combination with a relatively shallow supernatant level provides for consistent reliable operation, easy maintenance, and reasonably long filter runs as deemed very desirable in remote rural locations.

1 Claim, 5 Drawing Sheets

Top plan view I - Fig.5
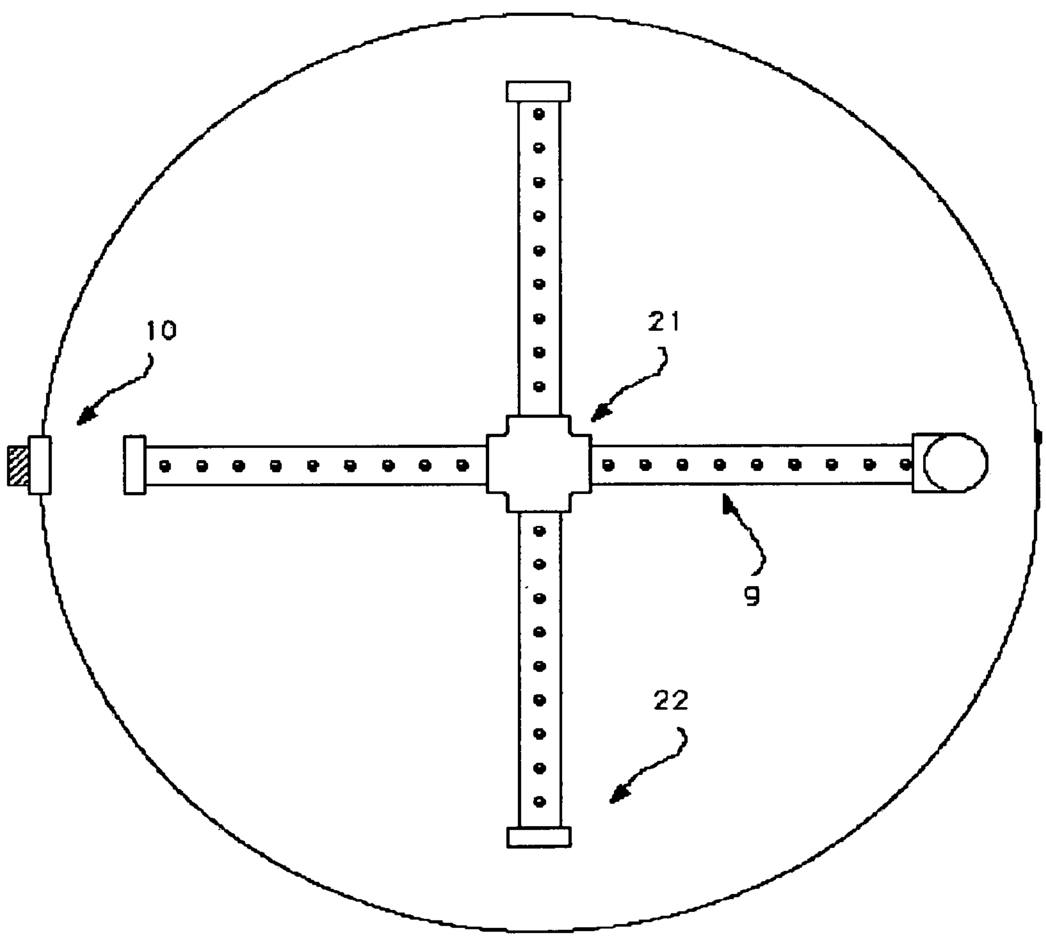

SSF/X SLOW SAND FILTER

FIELD OF THE INVENTION

This invention relates to the purification and filtration of drinking water.

BACKGROUND AND SUMMARY

Slow sand filters have been in operation for more than 150 years to provide water safe from bacteria, viruses, Giardia cysts and turbidity. Slow sand filters rely on a biologically active matrix that naturally develops on the top of the sand for high efficiency. Slow sand filters need to incorporate features that make them easy to install, and easy to maintain. Additionally slow sand filters should have features that protect the biological layer and carefully regulate flow for maximum efficiency. The advent of the use of plastic containers has resulted in a number of small packaged slow sand filters, including the current invention the SSF/x slow sand filter.

It was the inventors intention to design a package slow sand filter that required as little assembly by the end-user as possible, and further embodied a complete, efficient appearance after manufacture for turnkey installation and maintenance. In this regard, several problems with prior art packaged slow sand filters were noted by the inventor One problem is that most if not all package plant slow sand filters include hydraulic schemes that exit the filter at the bottom of the filter vessel and then have various piping systems that are assembled on or adjacent to the exterior of the filter (Manz U.S. Pat. No. 5,993,672, Pyper U.S. Pat. No. 5,032,261, Cluff U.S. Pat. No. 5,112,483, Simpson U.S. Pat. No. 5,264,129). This appeared to be a problem to the inventor because it requires additional unnecessary assembly steps prior to installation. This is a problem because there is the possibility of installing incorrect parts, loss of parts in shipment, and incorrect assembly of parts. If the exterior pipes are installed prior to shipping, it seemed probable that they would be vulnerable to breakage in transit, unpacking, or in installation. The inventor desired to produce a filter that was pre-assembled and self-contained as much as possible in order to avoid lost parts, use fewer parts, minimize possibility of breakage, and be as fool-proof as possible to install and use.

To address these issues, the inventor employed a novel piping scheme that collects water as normal at the bottom of the filter, but then proceeds through pipe work up the inside of the filter vessel exiting at a height of 36" through a tank fitting in the vertical wall of the filter vessel. Several desirable features result from this novel piping scheme. This piping scheme prevents inappropriate piping from being installed and allows for the filter to be shipped in a more pre-assembled, self-contained condition further insuring proper installation. Placing the outlet of the filter above the filter sand level prevents the possibility of de-watering the delicate biological layer on top of the sand and thus killing it. Placing the outlet of the filter above the sand layer also provides less head pressure against the flow control device, making a larger orifice size available and thus making the flow control less susceptible to clogging. Since the piping system is pre-installed inside the filter vessel, it is not vulnerable to breakage in shipment, unpacking, or as maneuvered to install.

Secondly the inventor employed a device for flow control that attaches to the outside of the filter vessel tank fitting. This device incorporates a flow control being a neoprene washer with a precisely drilled hole that will only pass water at the rate prescribed for the filter. This eliminates guess work in installation and insures proper filter loading rate as calculated for the filter. This part of the apparatus is the only assembly on the outside of the filter. The inventor decided to place the flow control on the outside of the filter vessel so that it could be serviced without risking cross contamination possible if the flow control was located in proximity to the raw water within the filter vessel.

Thirdly, the inventor placed a valve emerging from the side of the filter vessel above the sand level to drain off the supernatant water above the sand during the wet harrowing process. Wet harrowing involves raking or stirring the top layer of sand and thereby releasing filtered material into the supernatent water above the sand. The Harrowing valve then discharges the now dirty supernatant water to waste. Wet harrowing does not require removing the top layer of sand during cleaning, or removing a geofilter cloth (Pyper U.S. Pat. No. 5,032,261). Resanding is not necessary because no sand is removed. The biological layer is not exposed to air, and is therefore back up to removal efficiency in minutes to hours instead of days.

Another problem with prior art plants is the lack of simple headloss measurement devices. It is important to measure headloss because short of failure of the system to continue processing water due to excessive buildup of filtered material, headloss measurement is the best way to determine when the filter needs to be cleaned. On prior art devices, headloss measurement devices are either not present (Pyper U.S. Pat. No. 5,032,261, Cluff U.S. Pat. No. 5,112,483, Simpson U.S. Pat. No. 5,264,129), or employ electrical sensors (Manz U.S. Pat. No. 5,993,672). The inventor felt that it was necessary to have a simple device to measure headloss so that the end user can tell from merely looking at the outside of the device when it needs cleaning. Further any headloss measurement device should not require power, because not all installation sites will have power available. Prior to the flow control is a tee fitting with a segment of clear PVC pipe extending vertically to the top of the filter and open at the top end. This structure acts as a piezometer, that is a device to measure headloss in the filter. As the filter is operated, the water level in the peizometer tube drops as headloss builds up in the filter. The piezometer needs to be on the outside of the filter vessel in order to be easily read. It is important to make sure that the piezometer is installed prior to the flow control device to measure properly. The inventor insures this by placing a ½" male iron pipe threaded PVC fitting such that the flow control device can only be attached to the filter in the proper direction. Several surprising and unexpected results from these improvements include:

An unexpected result of locating the piezometer on the outlet piping assembly before the flow control is that it acts as a siphon break insuring that the filter cannot be inadvertently dewatered by siphon action working against the flow control device. An unexpected result of the internal piping scheme is that the piping is thereby freeze protected, unlike prior art systems.

An unexpected result is that the internal piping scheme is safer from vandalism than exposed piping on prior art systems.

An unexpected result is that in order for the fixed rate flow control to work effectively, it needs to be placed above the sand layer with no more than 12" head pressure against it in a normal filtering mode. This supernatant level lower than traditional slow sand filters (36") unexpectantly provides added oxygen levels to the biological layer of the filter.

BRIEF DESCRIPTION OF THE DRAWINGS

FIG. 5 is a top plan view of the underdrain and a drain plug for filter shown in FIG. 1.

DETAILED DESCRIPTION OF DRAWINGS

Figure 1:
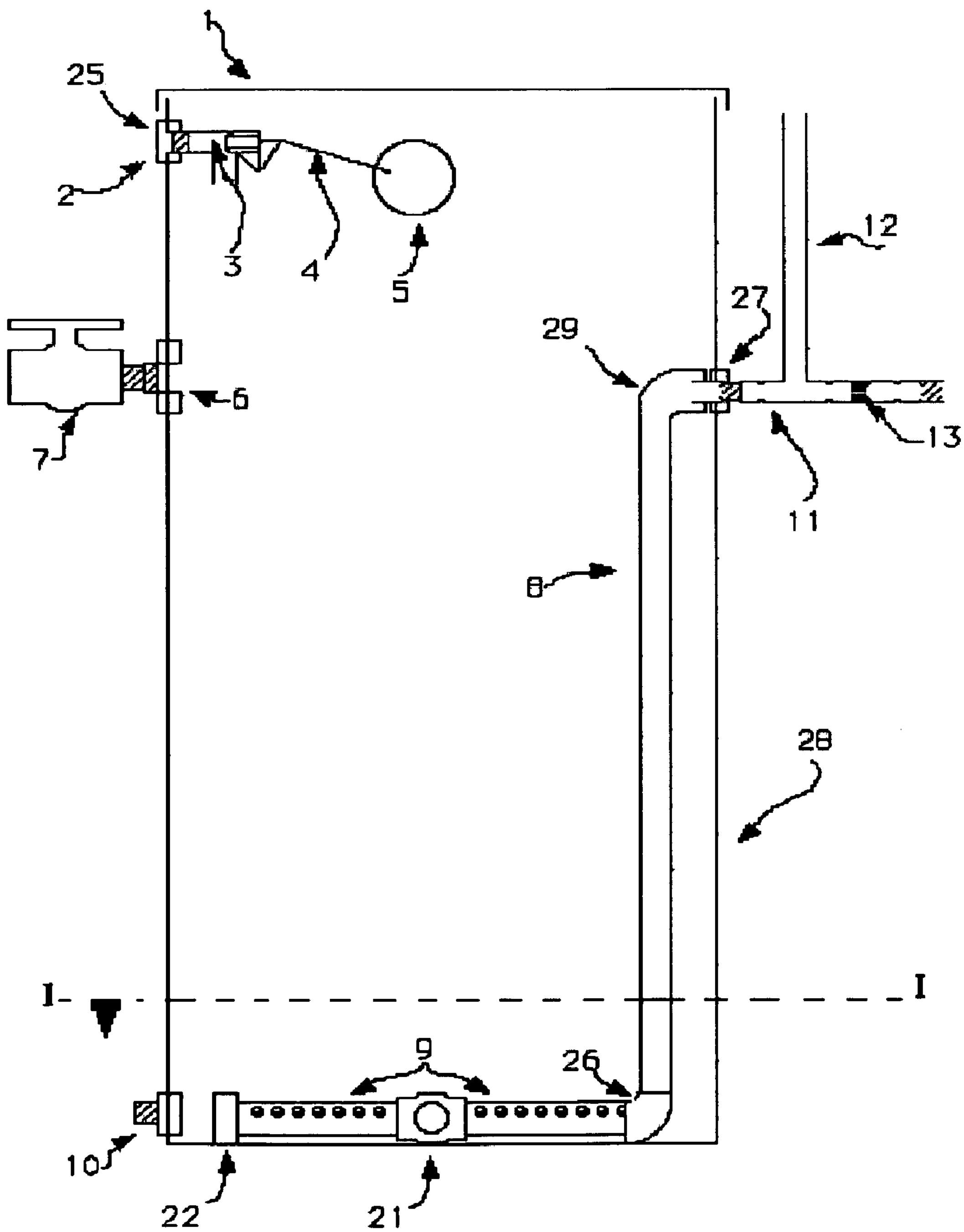
FIG. 1 is a side section of an SSF/x slow sand filter in resting position

Referring to FIG. 1. there is shown the preferred embodiment of an SSF/x slow sand filter in resting position. The slow sand filter includes a blow-molded or rotationally molded polyethylene vessel 28 with a tight fitting lid 1 to keep debris from entering the vessel and measuring about 24" diameter and about 50" high. The water inlet 2 including a ½" plastic tank fitting 25, a ½", plastic float valve 3, a float rod 4, and a plastic float 5 a located near the top sidewall of the filter vessel. The outlet of the filter is an assembly including perforated 1"×8" PVC pipes 9 (perforations about ³⁄₁₆" diameter every 2"), a 1" PVC cross 21, caps 22, 1" PVC elbows-29, a 1" riser pipe 8, and a slip x thread tank outlet fitting 27. The harrowing or cleaning apparatus includes a 1" threaded tank fitting 6 and a 1" PVC ball valve 7.

The flow control/piezometer assembly 11 is composed of a neoprene flow control 13 and a ½ open-ended transparent PVC tube 12 and is able to simultaneously measure headloss and regulate outlet flow. The flow control 13 utilizes a fixed orifice of a size consistent with the desired slow filtration rate.

Figure 2:
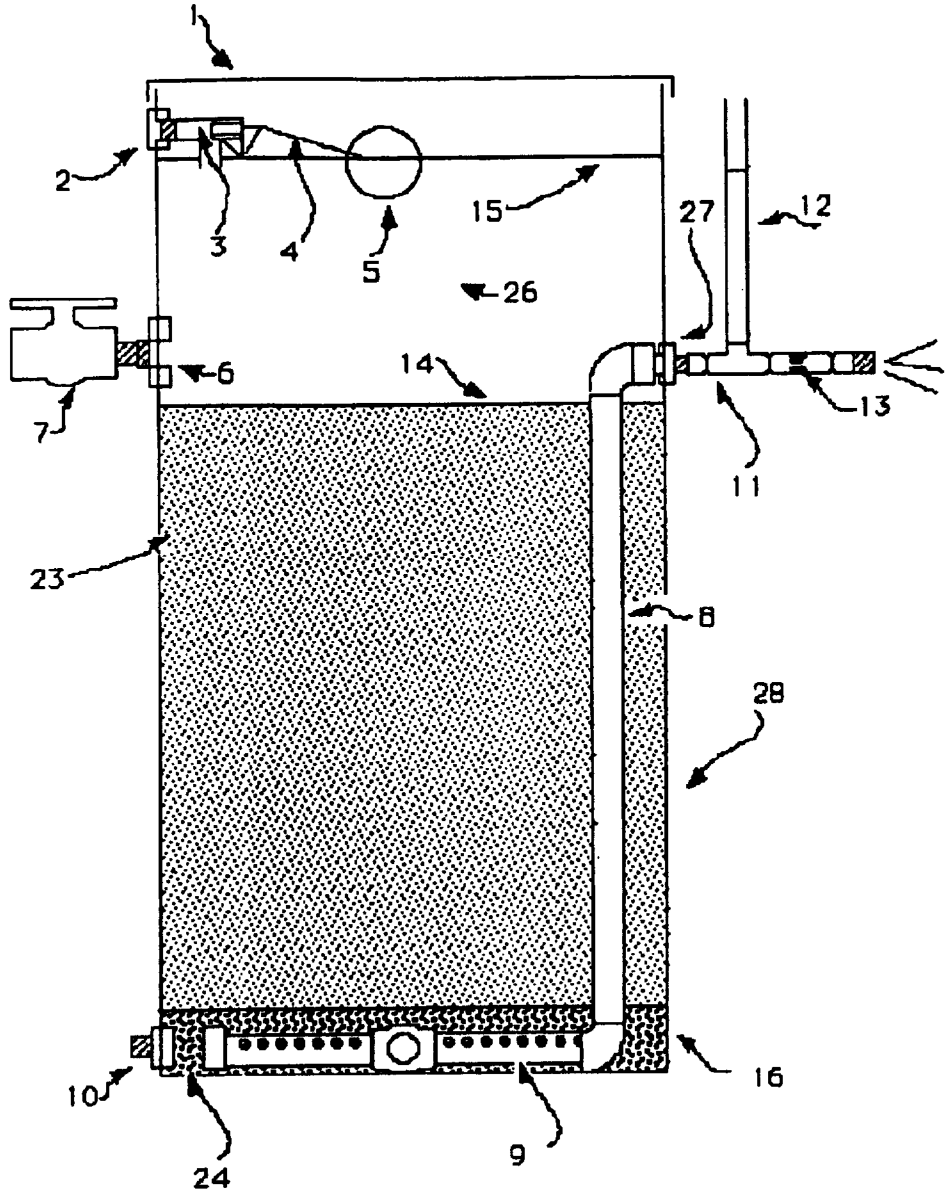
FIG. 2 is a side section of filter shown in FIG. 1 loaded with sand and gravel and in operating mode.

Referring to FIG. 2 there is shown a slow sand filter in operating condition with water entering vessel 28 through inlet 2 and filling to level 15. The water in the inlet chamber above the sand is called the supernatant 26. A biological layer, the schmutzedecke, naturally forms on the top of the sand 14. A thick layer of 0.35 m.m. sand 23 fills the vessel to a point just below the harrowing cleaning tank outlet fitting 6, that is at 14. Water filters downward through the sand and a 4" layer of ⅜" pea gravel 24. Here the water enters perforated 1" PVC pipes 9 proceeds up 1" PVC pipe 8 exiting filter through tank fitting 27. Water flow continues through flow control apparatus 11, is controlled through flow controller 13 and exits. Pressure headloss is indicated by water level in piezometer 12.

Figure 3:
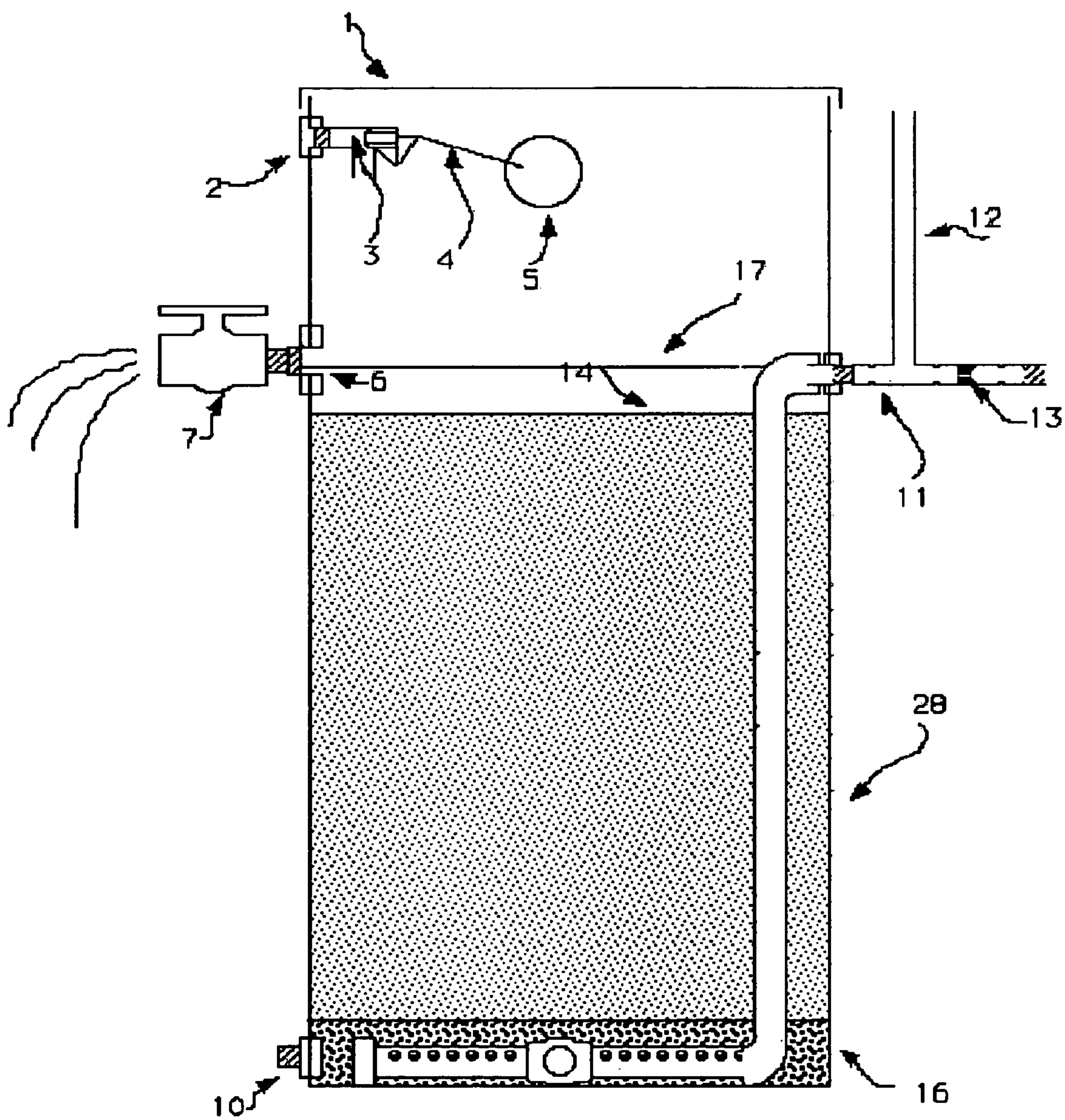
FIG. 3 is a side section of filter shown in FIG. 1 in harrowing or cleaning mode.

Referring to FIG.3 there is shown a slow sand filter in harrowing/cleaning mode. Valve 7 is opened and the schmutzedecke layer of the top 2 inches of sand 14 is vigorously agitated by stirring with a suitable implement such as a stick, rod, large spoon etc. releasing filtered material from the schmutzedecke layer and draining to waste through valve 7. Cleaning is continued until water level in filter vessel reaches 17. Valve 7 is then closed and filter allowed to refill through inlet 2 and outlet flow control 11. This process may be repeated until water is no longer dirty after stirring the schmutzedecke layer.

Figure 4:
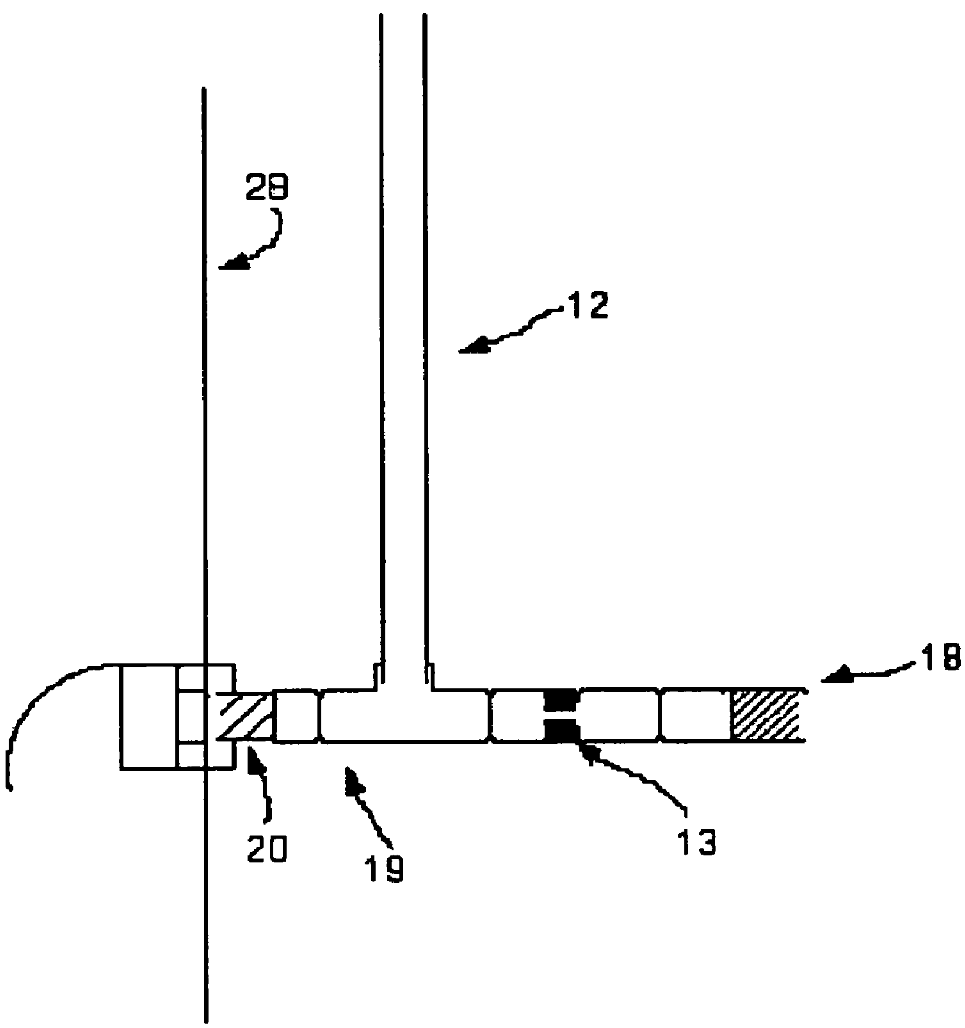
FIG. 4 is a detail of flow control/piezometer assembly.

Referring to FIG. 4 there is shown the flow control/anti-siphon/piezometer assembly composed of a ½" PVC male adaptor 20, a ½" PVC tee 19, a flow controller composed of a neoprene washer with a ³⁄₁₆" drilled hole inserted between 2½" couplings, a ½" PVC female adaptor 18, and a ½" clear PVC tube 12 open at the end and proceeding vertically to a point level with the top of the filter vessel 28.

Referring to FIG. 5 there is shown a top plan view of a slow sand filter showing the underdrain piping including a cross 21, four 1" by 8" perforated PVC pipes (perforations about ³⁄₁₆ diameter every 2) 9, 1" caps 22, and a drain 10.

ALTERNATIVE EMBODIMENTS

It should be noted that these descriptions represent a preferred embodiment to the invention and that other possible filter vessel sizes and materials may be used without departing from the spirit and scope of the invention.

CONCLUSION

The SSF/x slow sand filter employs several features that are significant improvements over prior art. These features, such as improved internal hydraulic design, pre-calibrated maximum flow, simplified pressure head-loss monitoring, and minimal post manufacturing assembly requirements, present a filter that is significantly more trouble free and reliable to install and operate than has been available to this point.

What is claimed is:

1. A slow sand filter for filtering water comprising:

(a) a linear, polyethylene filter vessel comprising
  (1) a top, a bottom, and a peripheral wall extending therebetween, said top comprising a removable lid,
  (2) at least one sand filtration layer position in a lower portion of said vessel and an inlet chamber in an upper portion of said vessel, a top surface of said sand filtration layer defining the lower boundary of said inlet chamber,
  (3) an inlet, an outlet, and a cleaning outlet in said peripheral wall above said sand filtration layer;

(b) a detachable indicating and flow control assembly for simultaneously measuring pressure head loss and regulating flow through said outlet, said assembly position exteriorly of said vessel and comprising
  (1) an end coupled to said outlet and a fixed orifice spaced from said end, said fixed orifice being of a size consistent with a desired slow sand filtration rate;
  (2) a vertically-extending, transparent piezometer tube fluidly communicating with said assembly and having a first end position downstream of said outlet and upstream of said fixed orifice and a second end proximate said vessel top for visually indicating in said filter,
  said assembly providing an anti-siphon function for said outlet, said fixed orifice being positioned above the level of the sand layer top surface that no more than 12 inches of head pressure is applied against the fixed orifice in a normal filtration mode;

(c) a filtered water collection assembly comprising
  (1) a perforated portion adjacent said vessel bottom for receiving water filtered in said sand filtration layer, and
  (2) a riser pipe extending through said sand filtration layer and fluidly coupled between said perforated portion and said outlet; and (d) a valve coupled to said cleaning outlet for draining supernatant during harrowing of the sand layer top surface, when cleaning is necessary as indicated by a water level in said piezometer tube.

* * * * *